US008043081B2

(12) United States Patent
Goto

(10) Patent No.: US 8,043,081 B2
(45) Date of Patent: Oct. 25, 2011

(54) MOLD FOR FORMING DEVELOPER BLADE, AND DEVELOPER BLADE FORMED WITH SAME

(75) Inventor: Taihei Goto, Shiki (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 11/581,448

(22) Filed: Oct. 17, 2006

(65) Prior Publication Data

US 2007/0114357 A1 May 24, 2007

(30) Foreign Application Priority Data

Oct. 17, 2005 (JP) ................................ 2005-301868
Apr. 27, 2006 (JP) ................................ 2006-122984

(51) Int. Cl.
*B29C 45/14* (2006.01)
*B32B 27/08* (2006.01)
*B22D 19/00* (2006.01)

(52) U.S. Cl. ........................ 425/129.1; 425/195; 249/83

(58) Field of Classification Search .................. 425/117, 425/127, 129.1, 591, 440, 445, 446, 116, 425/195; 249/83, 85, 91, 109, 114.1, 115, 249/116; 264/35, 259; 428/332, 333, 337, 428/338, 344, 355 R, 356; 399/284
See application file for complete search history.

(56) References Cited

U.S. PATENT DOCUMENTS

| | | | | |
|---|---|---|---|---|
| 4,336,009 | A * | 6/1982 | Wolf | 425/116 |
| 5,713,120 | A * | 2/1998 | Watabe et al. | 29/527.4 |
| 5,876,656 | A * | 3/1999 | Goto et al. | 264/450 |
| 5,933,692 | A * | 8/1999 | Niwano et al. | 399/284 |
| 6,475,421 | B2 * | 11/2002 | Niwano et al. | 264/266 |
| 6,528,158 | B1 * | 3/2003 | Kuroda | 428/332 |
| 2002/0181224 | A1 * | 12/2002 | Tahara et al. | 362/31 |
| 2005/0218560 | A1 * | 10/2005 | Booth | 264/299 |
| 2006/0035088 | A1 * | 2/2006 | Takano et al. | 428/413 |
| 2006/0277743 | A1 * | 12/2006 | Goto | 29/527.1 |

FOREIGN PATENT DOCUMENTS

| | | | |
|---|---|---|---|
| JP | 4-55872 | A | 2/1992 |
| JP | 09-244404 | A | 9/1997 |
| JP | 09-292771 | A | 11/1997 |
| JP | 11015267 | A * | 1/1999 |
| JP | 11-231647 | A * | 8/1999 |
| JP | 2000206785 | A * | 7/2000 |
| JP | 2000347501 | A * | 12/2000 |
| JP | 2001-117357 | A | 4/2001 |

(Continued)

OTHER PUBLICATIONS

Translation of JP 2005-274646.*

(Continued)

*Primary Examiner* — Joseph S. Del Sole
*Assistant Examiner* — Dimple Bodawala
(74) *Attorney, Agent, or Firm* — Sughrue Mion, PLLC

(57) ABSTRACT

The present invention provide a mold for forming a developer blade and a developer blade manufactured with such a mold which are able to give images of good quality even in the low-temperature low-humidity condition and to improve a mold releasability. A mold 10 for forming a developer blade has a plate accommodation space 14 in which the metal plate is accommodated and a belt-like cavity 15 for forming the elastic member adjacent to the plate accommodation space. At least a part 20*a* of a cavity surface 20 defining the cavity 15 in the cross section taken along the cavity width direction is finished to have a surface roughness Ry of not more than 10 μm.

5 Claims, 6 Drawing Sheets

FOREIGN PATENT DOCUMENTS

| | | | | |
|---|---|---|---|---|
| JP | 2001092245 | A | * | 4/2001 |
| JP | 2001117356 | A | * | 4/2001 |
| JP | 2002372859 | A | * | 12/2002 |
| JP | 2004-117919 | A | | 4/2004 |
| JP | 2004101551 | A | * | 4/2004 |
| JP | 2004163615 | A | * | 6/2004 |
| JP | 2005246957 | A | * | 9/2005 |
| JP | 2005-274646 | A | | 10/2005 |
| JP | 2005331755 | A | * | 12/2005 |
| JP | 2006-292894 | A | | 10/2006 |

OTHER PUBLICATIONS

Translation of JP 2001-117357.*
Translation of JP 11-015267 A.*
Japanese Office Action Jun. 22, 2010 for Japanese Application No. 2006-122984 with translation.
Japanese Office Action dated Jan. 4, 2011 for Japanese Patent Application 2005-301868 with English translation.
Chinese Office Action dated Jun. 6, 2008.

* cited by examiner

MOLD FOR FORMING DEVELOPER BLADE, AND DEVELOPER BLADE FORMED WITH SAME

TECHNICAL FIELD

The present invention relates to a mold for forming a blade regulating the amount of developer on the circumference of a development roller used in an image-forming device, and to a developer blade formed with such a mold, more specifically, a developer which can improve a quality of images formed by the image-forming device and which has a good mold releasability.

RELATED ART

An image-forming device such as a color laser printer generally uses a nonmagnetic development roller to supply color toners (developer) in order to reveal a latent image formed on a photoconductive drum. As schematically shown in FIG. 1, the image-forming device is configured such that the color toner 93 captured on the circumference of the development roller 92 arranged adjacent to the photoconductive drum 91 is transferred from the development roller 92 to the photoconductive drum 91 with a rotation of the development roller 92.

In order to obtain a good image, it is important to regulate the amount of toner and its electrostatic charge on the circumferential of the development roller within give ranges. To this end, a developer blade 94 is arranged such that it is proximity to the circumference of the development roller 92. The developer blade 94 regulates the thickness of the toner layer 93 on the circumference of the development roller 92 to control the feed rate. In addition, the developer blade 94 frictionally charges the toner and acts to regulate the electrostatic charge of the toner. This type of the developer blade 94 consists of a metal plate, one side of which is supported by a holder, and an elastic member 97 adhered to the metal plate 96 (see Japanese Patent Application Laid-open No. 2005-274646).

DISCLOSURE OF THE INVENTION

However, the conventional developer blade 94 does not always give images of good quality in a low-temperature low-humidity condition, and thus is demanded to be improved. As a countermeasure against this problem, it has been attempted to improve the image quality by optimizing the surface roughness of the elastic body adjacent to the development roller, but such an attempt in not always enough.

The present invention has been completed in view of these issues, and its object is to provide a mold for forming a developer blade and a developer blade manufactured with such a mold which are able to give images of good quality even in the low-temperature low-humidity condition and to improve a mold releasability.

<1> The present invention provides a mold for forming a developer blade having a belt-like metal plate and an elastic member adhering to the metal plate in parallel with the metal plate, wherein the mold comprises a plate accommodation space in which the metal plate is accommodated and a belt-like cavity for forming the elastic member adjacent to the plate accommodation space, and wherein at least a part of a cavity surface defining the cavity in the cross section taken along the cavity width direction is finished to have a surface roughness Ry of not more than 10 μm.

<2> The present invention further provides a mold for forming a developer blade according to item <1>, wherein at least the part of the cavity surface is finished by a texturing process.

The term "texturing process" as used herein refers to a process for forming concaves and convexes on the cavity surface, comprising the steps of drawing patterns constituting a base of the texture on the cavity defining surface of the mold with acid-resistant ink, etching the cavity defining surface with acidic liquid or the like, optionally adjusting a graze of the surface by a sandblasting or a beadblasting. Various types of textures including, but not limited to, leather grain may be used.

<3> The present invention further provides a mold for forming a developer blade according to item <1>, wherein at least the part of the cavity surface is finished by a texturing process or a sandblasting process and then by a beadblasting process.

The term "sandblasting process" as used herein refers to a surface processing in which blast materials mainly composed of inorganic materials such as alumina and SiC are blown out by the compressed air. The term "beadblasting process" as used herein refers to a process in which glass beads are employed as the blast material.

<4> The present invention further provides a mold for forming a developer blade according to any one of items <1>-<3>, wherein assuming that the cavity surface is divided into two sides in the cross section taken along the cavity width direction with a given point on the surface being as their border, only one side is finished and the cavity surface of the other side has a surface roughness of not more than 1.5 μm.

<5> The present invention further provides a mold for forming a developer blade according to item <4>, wherein assuming that a point P is nearest point to the developer blade on the elastic member in a position where the developer blade is to be installed in a device, the give point on the cavity surface as the border is arranged such that the distance from a point on the cavity surface corresponding to the point P is within a range from −2 mm to 2 mm in the cross section taken along the cavity width direction.

<6> The present invention further provides a mold for forming a developer blade according to any one of items <1>-<5>, wherein the finished surface has a surface roughness of 0.5-5.0 μm.

<7> In another aspect, the present invention provides a developer blade formed with a mold for forming a developer blade according to any one of items <1>-<6>, wherein a transfer pattern of the finished surface is shaped on at least a part of an exposed surface of the elastic member in the cross section taken along the width direction.

BEST MODE FOR CARRYING OUT THE INVENTION

Figure 2A:
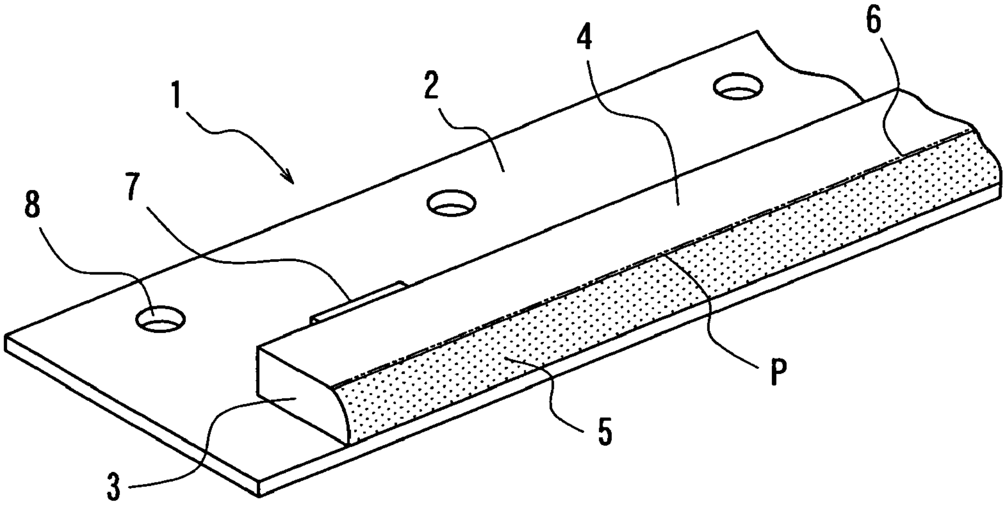
FIGS. 2(*a*)-(*c*) are a perspective view, front view and sectional view, respectively, of a developer blade formed a mold according to the present invention.
Figure 2B:
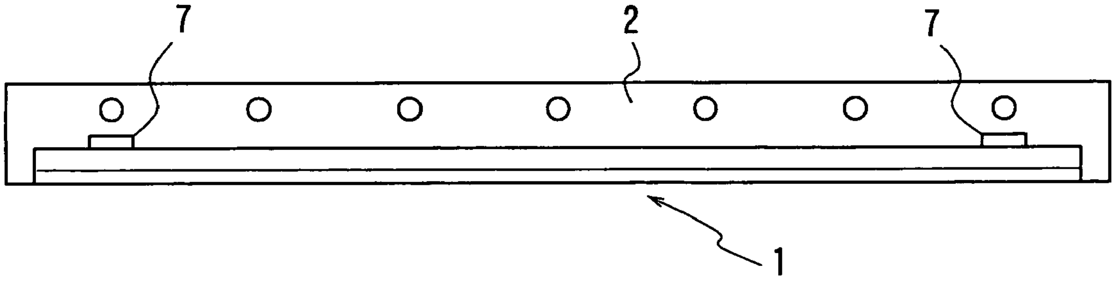
Figure 2C:
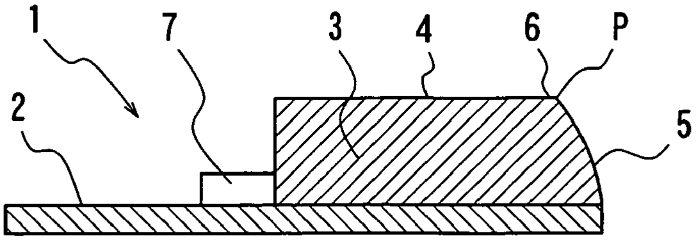

With reference to the drawings, embodiments of the present invention will be discussed below. FIGS. 2(*a*)-(*c*) are a perspective view, front view and sectional view, respectively, of a developer blade formed a mold according to the present invention. A development blade 1 consists of a belt-like thin metal plate 2 and an elastic member 3 adhering to one side of the metal plate 2. The development blade 1 may be formed by placing a metal plate on which an adhesive is applied in a cavity of the mold, pouring a forming material such as a liquid silicone rubber and allowing to curing.

As the metal plate 2, a thin plate having a thickness of 0.05-0.5 mm made of aluminum, stainless steel or copper is preferred. Such a plate can satisfy the flexibility and strength required for the metal plate 2. In the figures, the reference numeral 7 denotes a tab formed by a tab-forming portion of the mold for restricting the flow of the forming material leaving a gate to the cavity. The reference numeral 8 denotes a mounting hole for mounting the developer blade to a holder of the image-forming device. Hereinafter, a side of the development blade 1 which is mounted on the holder is referred to as a base side, and the other side is referred to as a tip side.

In the FIG. 2(*c*) which is a sectional view taken along the width direction, the point P is a point closest to the development roller (hereinafter referred to as a "development roller closest point") in a position where the developer blade 1 is to be installed in a device. In the example shown, it locates on the ridgeline between a straight portion and a curved portion. The characteristics of the region adjacent to the point P largely affects the amount of the developer and the electrostatic charge, so that this region is carefully inspected for a blemish.

The region 5 which is a part of the exposed surface of the elastic member 3 in the widthwise section consists of pattern transferred surfaces on which patterns formed on the mold cavity surface with the later-described process are transferred. The remaining regions are finished to be smooth surfaces. The border 6 between the region 5 of the pattern transferred surface and the region of the smooth surface is placed near the development roller closest point P. For the example shown in FIG. 2, the region 5 of the pattern transferred surface is arranged on the tip side of the developer blade with respect to the border 6.

Figure 3A:
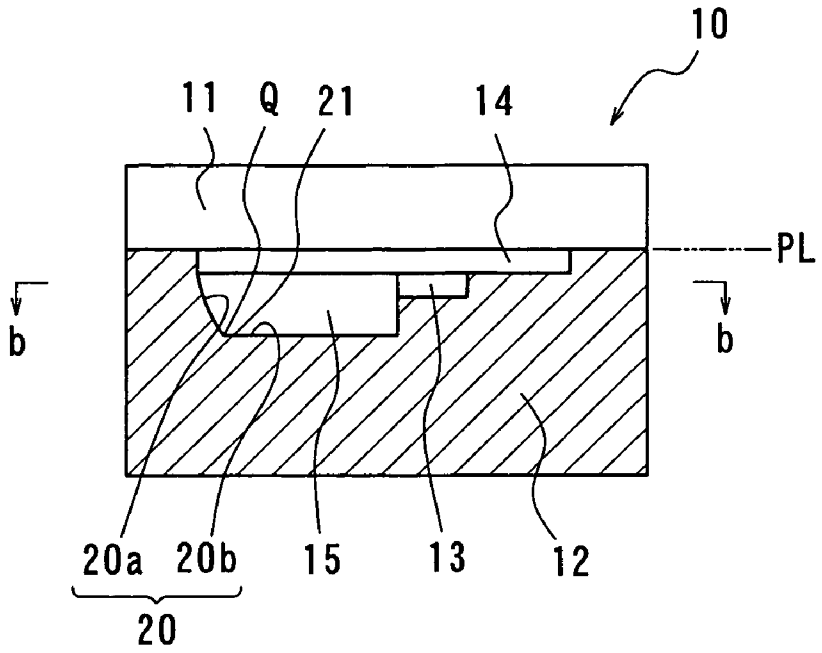
FIGS. 3(*a*) and (*b*) are sectional views of a mold according to the present invention.
Figure 3B:
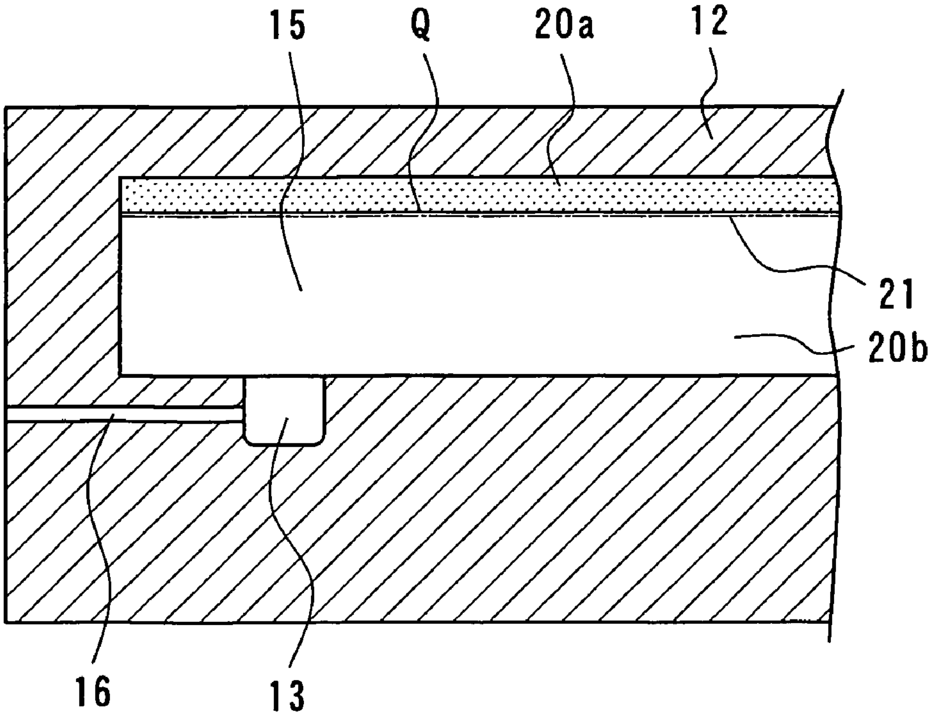

FIG. 3(*a*) is a widthwise sectional view of a single impression mold for forming the developer blade 1 shown in a state where the mold is closed, and FIG. 3(*b*) is a sectional view taken along the line b-b in FIG. 3(*a*). In the figure, a parting line of the mold is designated as PL. An upper mold element 11 is laid on one side of the line PL and a lower mold element 12 is laid on the other side of the line PL. In the lower mold element 12, there are provided a plate accommodation space 14 in which the metal plate 2 is placed and a belt-like cavity 15. A tab forming portion 13 with a shape corresponding to that of the tab is arranged adjacent to the cavity 15. A runner 16 for feeding the material is communicated with the tab forming portion 13.

In FIG. 3(*a*) which is a sectional view taken along the cavity width direction, at least one surface 20*a* with a point 21 on the cavity surface 20 being as a border is finished to have a surface roughness Ry of not more than 10 μm. This may be achieved by, for example, a texturing process, sandblasting process, beadblasting process and combination thereof. The cavity surface 20 defining the cavity 15 may be entirely treated in this way, but preferably it is partly treated. In this case, the other surface 20*b* with respect to the border 21 is preferably finished to be a smooth surface having a surface roughness of not more than 1.5 μm.

The surface roughness Ry of the treated surface 20*a* is preferably within a range of 0.5-5.0 μm. The above-mentioned point as the border (border point) 21 are arranged near the point Q on the cavity surface 20 corresponding to the development roller closest point P on the elastic member 6, preferably with a distance from the point Q being within a range from −2 mm to 2 mm. In this way, both the region 5 of the pattern transferred surface and the region 4 of the smooth surface exist near the development roller closest point P, so that development performance at the vicinity of the point P, which most largely affects when the characteristics of the toner is determined, may be improved by the pattern transferred surface. At the same time, inspection for a blemish in the region near the point P may be facilitated. As a result, both of the improvement of the development performance and the facility of the inspection may be satisfied together.

Figure 4:
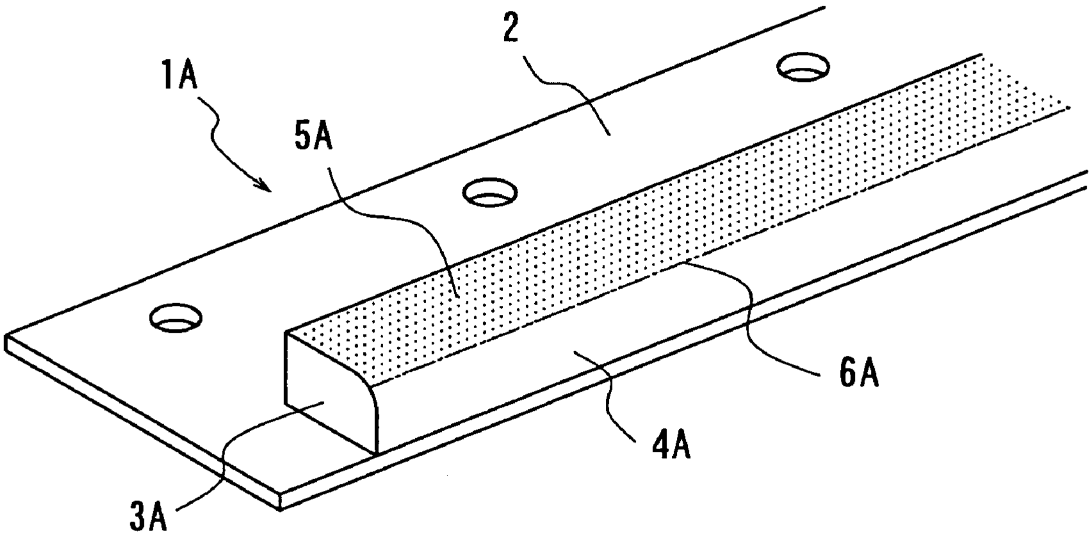
FIG. 4 is a perspective view of a developer blade formed with another mold according to the present invention.

FIG. 4 is a perspective view of the development blade 1A formed with a mold according to another embodiment of the present invention. The developer blade 1A also consists of the metal plate 2 and the elastic member 3A adhering to the metal plate 2. The metal plate is identical to the metal plate of the development blade 1 in the embodiment already described with reference to FIG. 2. The elastic member 3A is also identical to the elastic member 3 of the above-described embodiment in the point that it has the same widthwise sectional shape and a part of the exposed surface consists of the region 5A of the pattern transferred surface, but they are different in the point that the region 5A of the pattern transferred surface is arranged on the developer blade base side with respect to the border 6A with the smooth surface region 4A. In this case, both of the region 5A of the pattern transferred surface and the smooth surface region 4A exist near the development roller closest point P as well, so that the improvement of the development performance and the facility of the inspection may be satisfied together.

Figure 5:
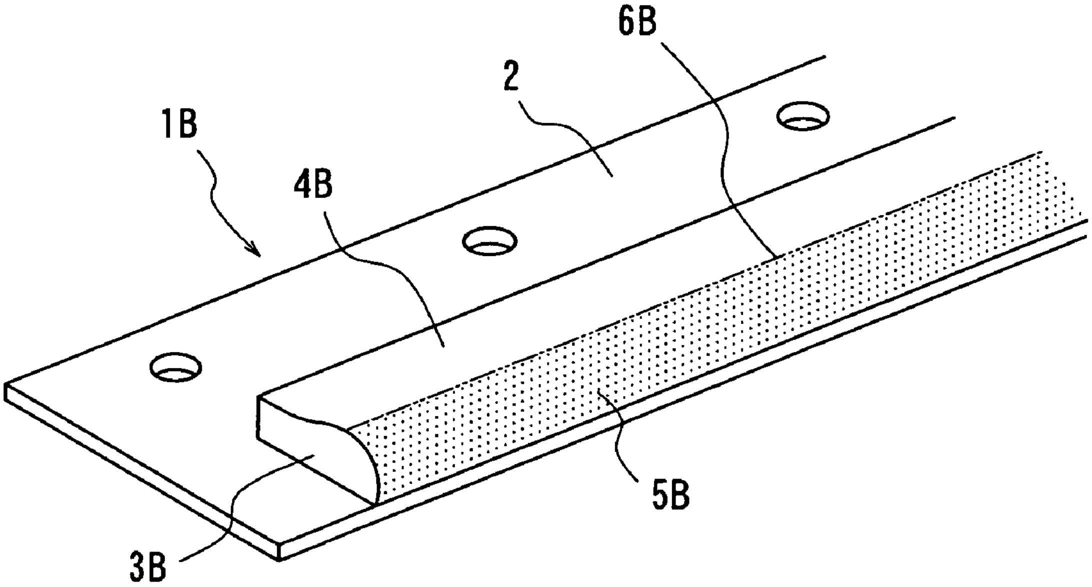
FIG. 5 is a perspective view of a developer blade formed with yet another mold according to the present invention.

FIG. 5 is a perspective view of a developer blade 1B formed with a mold having a widthwise sectional shape of a cavity which is different from those of the above-mentioned molds for forming the developer blades 1 and 1A. The developer blade 1B has an elastic member 3A having a widthwise sectional shape which is different from those of the developer blades 1 and 1A. In this case, however, the region 5B of the pattern transferred surface is arranged on one side with respect to the border 6B located near the development roller closest point on the elastic member 3A, and the region 4B of the smooth surface is arranged on the other side with respect to the border 6B.

Figure 6:
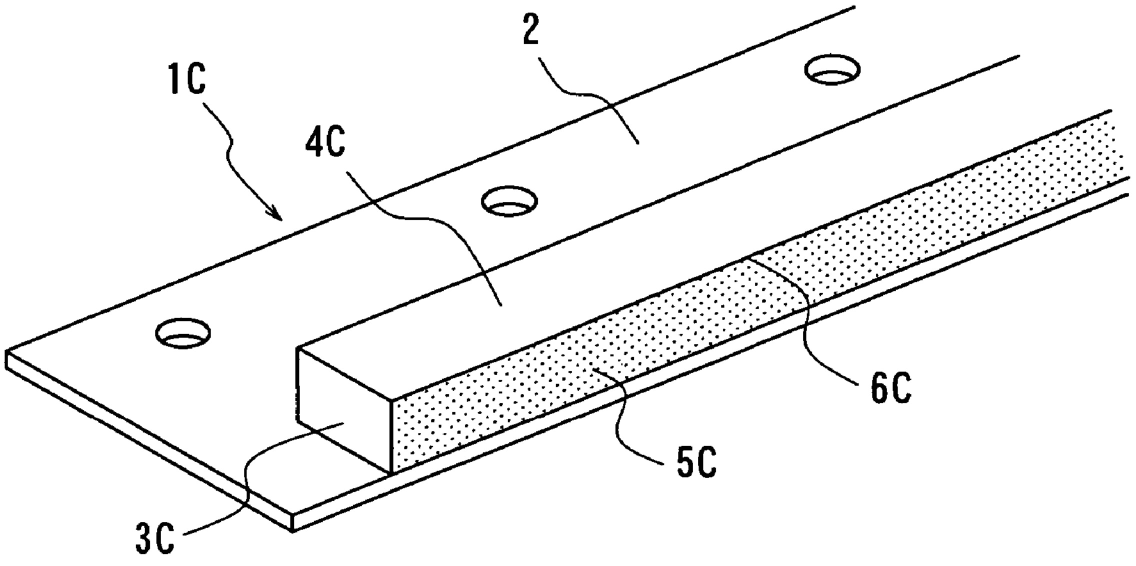
FIG. 6 is a perspective view of a developer blade formed with still another mold according to the present invention.

FIG. 6 is also a perspective view of a developer blade 1C formed with a mold having a widthwise sectional shape of a cavity which is different from those of the above-mentioned molds for forming the developer blades 1, 1A and 1B. In the developer blade 1C, the sectional shape of an elastic member 3C is different from those of the elastic members 3, 3A and 3B, but again the region 5C of the pattern transferred surface is arranged on one side with respect to the border 6C located near the development roll closest point on the elastic member 3C, and the region 4C of the smooth surface is arranged on the other side with respect to the border 6C.

Figure 7A:
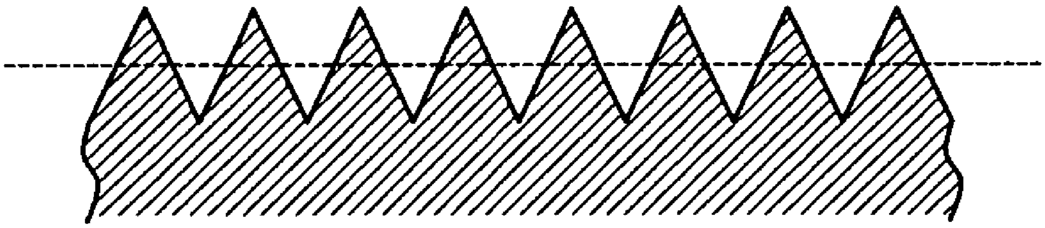
FIGS. 7(*a*) and (*b*) show surface profiles of the mold finished by either of a texturing or sandblasting process and by a complex process, respectively.
Figure 7B:
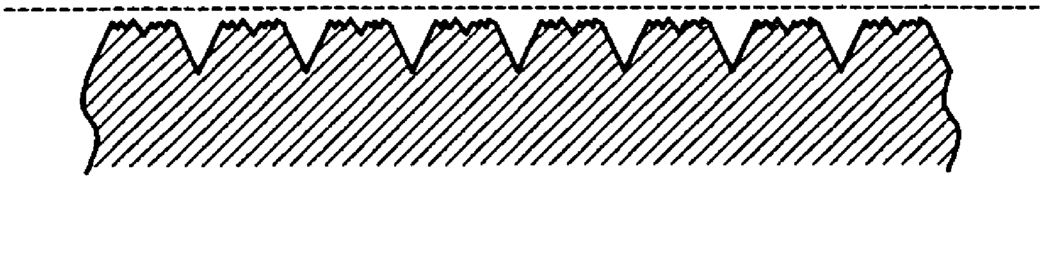

In one embodiment of the present invention, a complex process in which either of a texturing process or sandblasting process is applied and then a beadblasting process is applied is adopted to finish a part of the cavity for forming the elastic member of the mold for forming the developer blade. As a result, it gives good images, which may also be obtained with a texturing process or sandblasting process alone, and, in addition, it gives good mold releasability and improves the gloss level, which facilitates an inspection. FIGS. 7(*a*) and 7(*b*) show surface profiles of the mold finished by either of a texturing process or a sandblasting process and by a complex process, respectively. As shown in FIG. 7(*a*), in the case where either one of the texturing or sandblasting process is applied, a concave-convex patter in which projections and depressions alternatively appear can be seen. In contrast, as shown in FIG. 7(*b*), in the case where the complex process is applied, the projections of the concave-convex pattern are abraded and thus only the depressions can be seen. As a result, it is estimated that good mold releasability and a good gloss level can be obtained. The particle diameter of the beads used in the sandblasting process is preferably within a range of 10-500 μm, and more preferably 30-100 μm.

EXAMPLES

Examples 1 and 2

A mold having the widthwise sectional shape shown in FIG. 3 is prepared. A part of the cavity surface of the mold is finished by a texturing process. The developer blade of Example 1 is manufactured with this mold. Then, the blade is mounted on an image-forming device. The printed image is evaluated, and the elastic member is visually inspected for a blemish crossing the development roller closest point P in the widthwise direction to give a detection rate of the blemish. These results are shown in Table 1.

The image is evaluated such that a paper is printed entirely in solid black or white then the printed paper is visually inspected. In the table, an acceptance level is indicated by "A", an apparently unacceptable level is indicated by "C", and a lever which is better than "C" but is still unacceptable is indicated by "B".

The detection rate of the blemish is calculated in such a way that the number of blemishes detected by the visual inspection is divided by the number of blemishes detected by a precise inspection with a microscope and a surface roughness meter. In Table 1, the detection rate greater than 90% is indicated by "A", the detection rate less than 10% is indicated by "C" and the detection rate between 10% and 90% is indicated by "B".

The developer blade of Example 2 is manufactured with the same mold as Example 1 except that the entire cavity surface is finished by a texturing process. The developer blade of Comparative Example 1 is manufactured with the same mold as Example 1 except that the entire cavity surface is mirror-finished to have a surface roughness Ry of not more than 0.2 μm. The developer blade of Comparative Example 2 is manufactured with the same mold as Example 1 except that the entire cavity surface is machine-finished to have a surface roughness Ry of 0.2-1.5 μm. For the developer blades of Example 2 and Comparative Examples 1 and 2, the image evaluation and calculation of the detection rate are conducted in the same manner as Example 1. These results are also shown in Table 1.

Figure 1:
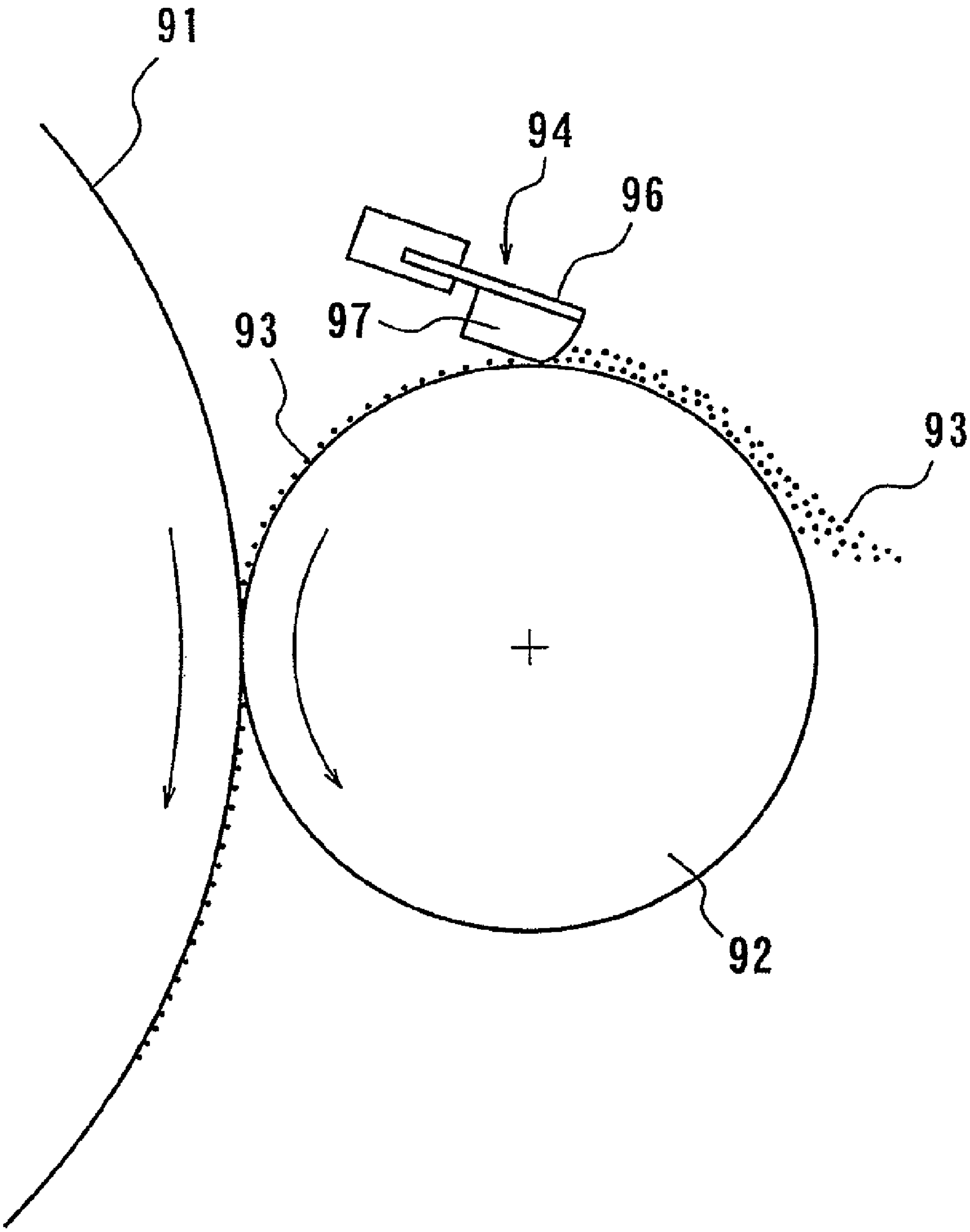
FIG. 1 (Related Art)
FIG. 1 is a schematic diagram showing a mounted position of a developer blade.

In the developer blades of Examples 1 and 2 and Comparative Examples 1 and 2, the metal plate is made of SUS and has a thickness of 0.1 mm, and the elastic member is made of silicone rubber and has a thickness of 1.5 mm and a width of 4 mm. Each of the developer blades is mounted on a printer as shown in FIG. 1 to conduct the image evaluation.

TABLE 1

| | | Example 1 | Example 2 | Comparative Example 1 | Comparative Example 2 |
|---|---|---|---|---|---|
| Image Evaluation | H/H condition solid black print | A | A | A | A |
| | H/H condition solid white print | A | A | A | A |
| | L/L condition solid black print | A | A | A | A |
| | L/L condition solid white print | A | A | C | B |
| Detection rate of blemish | Depth of 3 μm | A | C | A | C |
| | Depth of 10 μm | A | C | A | C |
| | Depth of 50 μm | A | B | A | B |
| | Depth of 100 μm | A | A | A | A |

In the table, L/L condition (Low-temperature Low-humidity condition) is a condition which has the temperature of 10° C. and the humidity of 15%. H/H condition (High-temperature High-humidity condition) is a condition which has the temperature of 28° C. and the humidity of 85%. The solid white print evaluation is an evaluation for a latent image which is expected to give an entirely white paper whether a black spot appears or not, and the solid black print evaluation is an evaluation for a latent image which is expected to give an entirely black paper whether a white spot appears or not.

As can be seen from Table 1, the developer blades of Examples 1 and 2 have good results in the image evaluation even in the L/L condition. Comparing these examples with Comparative Examples 1 and 2, it is appreciated that such results are realized by finishing at least a part of the mold to be the pattern transferred surface and giving the surface roughness Ry of 10 μm. In addition, since the developer blade of Example 1 has the smooth surface region near the development roller closest point, even the blemish with depth of 3 μm can be visually inspected with a higher detection rate, which is more preferred.

Examples 3 and 4

The developer blade of Example 3 is manufactured in the same way as Example 1 except that the mold is finished by a complex process. The developer blade of Example 4 is manufactured with the same mold as Example 3 except that the entire cavity surface is finished by a complex process. The developer blade of Comparative Example 3 is manufactured with the same mold as Example 3 except that the entire cavity surface is mirror-finished to have a surface roughness Ry of not more than 0.2 μm. The developer blade of Comparative Example 4 is manufactured with the same mold as Example 3 except that the entire cavity surface is machine-finished to have a surface roughness Ry of 0.2-1.5 μm. For the developer blades of Examples 1 and 2 and Comparative Examples 1 and 2, the image evaluation and calculation of the detection rate are conducted in the same manner as Example 1. These results are also shown in Table 2.

In addition, the mold releasability of the developer blades is also evaluated. In the table, the results of the evaluation are indicated by "A" (good), "B" (with some trouble) or "C" (unacceptable).

In the developer blades of Examples 3 and 4 and Comparative Examples 3 and 4, the metal plate is made of SUS and has a thickness of 0.1 mm, and the elastic member is made of silicone rubber and has a thickness of 1.5 mm and a width of 4 mm. Each of the developer blades is mounted on a printer as shown in FIG. 1 to conduct the image evaluation.

TABLE 2

| | | Example 1 | Example 2 | Comparative Example 1 | Comparative Example 2 |
|---|---|---|---|---|---|
| Image Evaluation | H/H condition solid black print | A | A | A | A |
| | H/H condition solid white print | A | A | A | A |
| | L/L condition solid black print | A | A | A | A |
| | L/L condition solid white print | A | A | C | B |
| Detection rate of blemish | Depth of 3 μm | A | C | A | C |
| | Depth of 10 μm | A | C | A | C |
| | Depth of 50 μm | A | B | A | B |
| | Depth of 100 μm | A | A | A | A |
| Mold releasability | | A | A | B | C |

As can be seen from Table 2, the developer blades of Examples 3 and 4 have good results in the image evaluation even in the L/L condition. Comparing these examples with Comparative Examples 3 and 4, it is appreciated that such results are realized by finishing at least a part of the mold to be the pattern transferred surface and giving the surface roughness Ry of 10 μm. In addition, since the developer blade of Example 3 has the smooth surface region near the development roller closest point, even the blemish with depth of 3 μm can be visually inspected with a higher detection rate, which is more preferred. Further, it is also appreciated that the developer blades of Examples 3 and 4 have superior mold releasability.

INDUSTRIAL APPLICABILITY

The developer blade according to the present invention can give a good image and good mold releasability even under a low-temperature low-humidity condition and can improve the gross level to facilitate an inspection, so that it can apply to image-forming devices in a various sizes.

The invention claimed is:

1. A mold for forming a developer blade having a belt-like metal plate and an elastic member adhering to the metal plate in parallel with the metal plate, wherein the mold comprises a plate accommodation space in which the metal plate is accommodated and a belt-like cavity for forming the elastic member adjacent to the plate accommodation space, and wherein at least a part of a cavity surface defining the cavity in the cross section taken along the cavity width direction is finished to have a surface roughness Ry of not more than 10 μm, and wherein when the cavity surface is divided into two sides in the cross section taken along the cavity width direction with a given point on the surface being as their border, each side having a different roughness, only one side is finished to have a surface roughness Ry of not more than 10 μm and the cavity surface of the other side has a surface roughness of not more than 1.5 μm, and border point (21) are arranged near point (Q) on the cavity surface corresponding to a development roller closet point (P) on the elastic member in a position where the developer blade is to be installed in a device, the border point on the cavity surface as a border is arranged such that the distance in either direction from the point (Q) on the cavity surface corresponding to the point (P) has a value of up to 2 mm in the cross section taken along the cavity width direction.

2. The mold for forming a developer blade according to claim 1, wherein at least the part of the cavity surface is finished by a texturing process.

3. The mold for forming a developer blade according to claim 1, wherein at least the part of the cavity surface is finished by a texturing process or a sandblasting process and then by a beadblasting process.

4. The mold for forming a developer blade according to claim 1, wherein the finished surface has a surface roughness of 0.5-5.0 μm.

5. The mold for forming a developer blade according to claim 1, wherein at least the part of the cavity surface comprises alternatively arranged projections and depressions.

* * * * *